(12) United States Patent
Huang

(10) Patent No.: US 12,548,226 B2
(45) Date of Patent: Feb. 10, 2026

(54) SYSTEMS AND METHODS FOR A THREE-DIMENSIONAL DIGITAL PET REPRESENTATION PLATFORM

(71) Applicant: Mars, Incorporated, McLean, VA (US)

(72) Inventor: Lung Huang, New York, NY (US)

(73) Assignee: Mars, Incorporated, McLean, VA (US)

( * ) Notice: Subject to any disclaimer, the term of this patent is extended or adjusted under 35 U.S.C. 154(b) by 253 days.

(21) Appl. No.: 18/353,240

(22) Filed: Jul. 17, 2023

(65) Prior Publication Data

US 2024/0062447 A1 Feb. 22, 2024

Related U.S. Application Data

(60) Provisional application No. 63/371,541, filed on Aug. 16, 2022.

(51) Int. Cl.
*G06T 13/40* (2011.01)
(52) U.S. Cl.
CPC .................. *G06T 13/40* (2013.01)
(58) Field of Classification Search
CPC .......... G06T 13/40; A63F 13/56; A63F 13/58; A63F 13/655; A63F 13/67; A63F 13/825
See application file for complete search history.

(56) References Cited

U.S. PATENT DOCUMENTS

| | | | | |
|---|---|---|---|---|
| 5,966,526 A | * | 10/1999 | Yokoi | A63F 13/58 703/11 |
| 2008/0096661 A1 | * | 4/2008 | Ikeda | A63F 13/332 463/40 |

(Continued)

FOREIGN PATENT DOCUMENTS

KR 102170991 B1 10/2020

OTHER PUBLICATIONS

Biggs Benjamin et al: "Creatures Great and SMAL: Recovering the Shape and Motion of Animals from Video", May 26, 2019 (May 26, 2019), Advances in Databases and Information Systems; [Lecture Notes in Computer Science; Lect.Notes Computer], Springer International Publishing, CHAM, pp. 3-19, XP047508251, ISBN: 978-3-319-10403-4 [retrieved on May 26, 2019].

(Continued)

*Primary Examiner* — Daniel F Hajnik
*Assistant Examiner* — Chris Alejandro Puntier
(74) *Attorney, Agent, or Firm* — Bookoff McAndrews, PLLC

(57) ABSTRACT

A computer-implemented method for creating a three-dimensional pet avatar. The method comprises receiving, by one or more processors, pet image data and at least one physical characteristic corresponding to at least one pet from a user device, the at least one physical characteristic including at least one pet breed, in response to sending an additional characteristic request to at least one service, receiving, by the one or more processors, at least one additional pet characteristic corresponding to the at least one pet breed from the at least one service, generating, by the one or more processors, at least one pet avatar based on the pet image data, the at least one physical characteristic, and the at least one additional pet characteristic, and displaying, by the one or more processors, the at least one pet avatar on one or more user interfaces of the user device.

20 Claims, 5 Drawing Sheets

(56) References Cited

U.S. PATENT DOCUMENTS

2014/0078144 A1    3/2014  Berriman et al.
2020/0312003 A1*  10/2020  Borovikov ............ A63F 13/213
2020/0406149 A1*  12/2020  Zhang .................... A63F 13/92
2022/0334705 A1*  10/2022  Tai ........................ G06F 3/0482

OTHER PUBLICATIONS

International Search Report issued in International Application No. PCT/US2023/070303 dated Nov. 8, 2023 (13 pages).
Ruegg Nadine et al: "BARC: Learning to Regress 3D Dog Shape from Images by Exploiting Breed Information", 2022 IEEE/CVF Conference on Computer Vision and Pattern Recognition (CVPR), IEEE, Jun. 18, 2022 (Jun. 18, 2022), pp. 3866-3874, XP034192569, DOI: 10.1109/CVPR52688.2022.00385 [retrieved on Sep. 27, 2022].

* cited by examiner

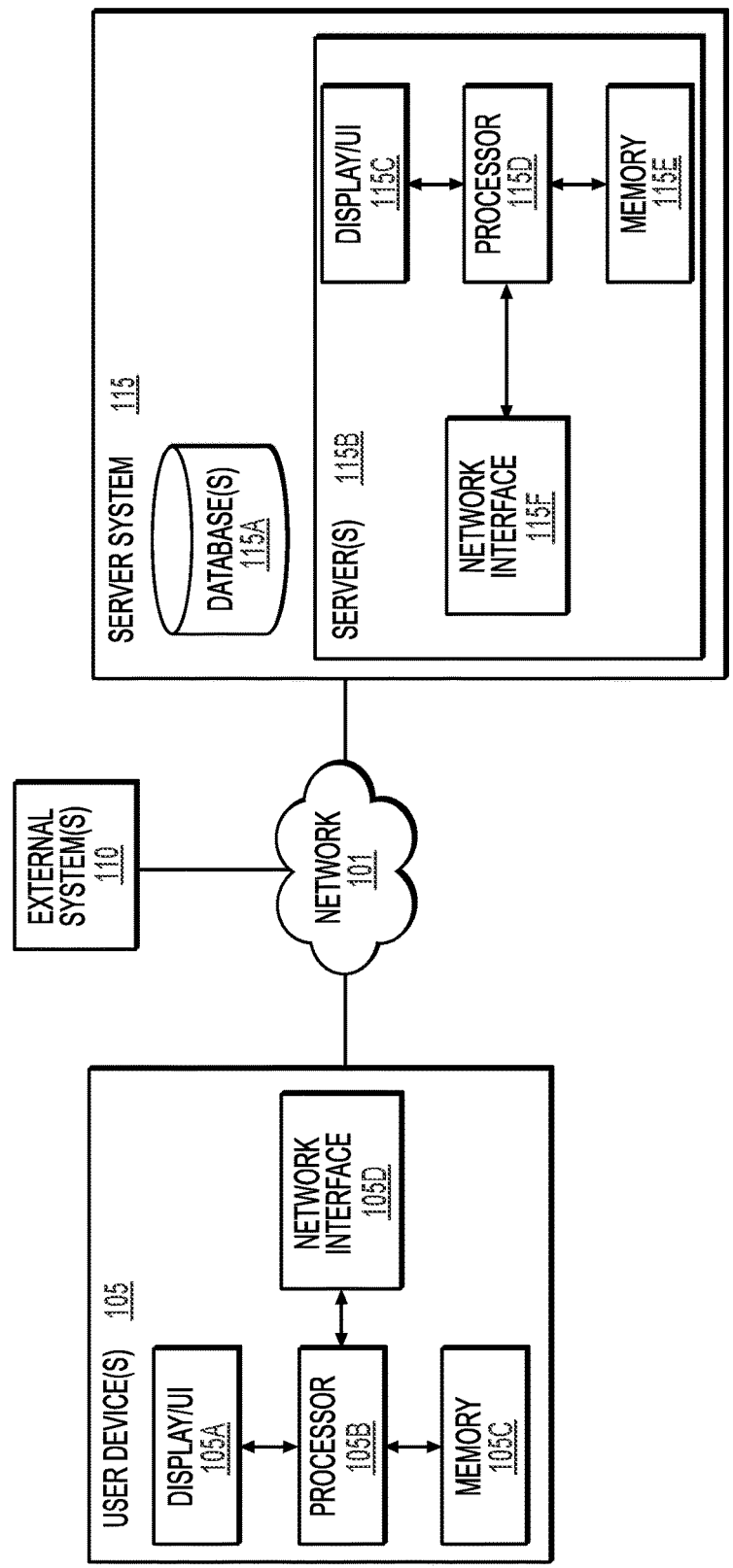

200

---

RECEIVING, BY ONE OR MORE PROCESSORS, PET IMAGE DATA AND AT LEAST ONE PHYSICAL CHARACTERISTIC CORRESPONDING TO AT LEAST ONE PET FROM A USER DEVICE, THE AT LEAST ONE PHYSICAL CHARACTERISTIC INCLUDING AT LEAST ONE PET BREED
202

↓

IN RESPONSE TO SENDING AN ADDITIONAL CHARACTERISTIC REQUEST TO AT LEAST ONE SERVICE, RECEIVING, BY THE ONE OR MORE PROCESSORS, AT LEAST ONE ADDITIONAL PET CHARACTERISTIC CORRESPONDING TO THE AT LEAST ONE PET BREED FROM THE AT LEAST ONE SERVICE
204

↓

CREATING, BY THE ONE OR MORE PROCESSORS, AT LEAST ONE PET AVATAR BASED ON THE PET IMAGE DATA, THE AT LEAST ONE PHYSICAL CHARACTERISTIC, AND THE AT LEAST ONE ADDITIONAL PET CHARACTERISTIC, WHEREIN THE AT LEAST ONE PET AVATAR INCLUDES A THREE-DIMENSIONAL PET REPRESENTATION OF THE AT LEAST ONE PET
206

↓

DISPLAYING, BY THE ONE OR MORE PROCESSORS, THE AT LEAST ONE PET AVATAR ON ONE OR MORE USER INTERFACES OF THE USER DEVICE
208

RECEIVING, BY ONE OR MORE PROCESSORS, ONE OR MORE PET AVATARS, ONE OR MORE PET AILMENTS, PET RECOVERY DATA OF ONE OR MORE PETS, AND/OR ONE OR MORE LEVELS OF RECOVERY, THE ONE OR MORE PET AVATARS INCLUDING A THREE-DIMENSIONAL REPRESENTATION OF EACH OF THE ONE OR MORE PETS
302

UPON THE RECEIVING, TRAINING, BY THE ONE OR MORE PROCESSORS, A MACHINE-LEARNING MODEL TO PREDICT THE ONE OR MORE LEVELS OF RECOVERY OF THE ONE OR MORE PET AVATARS
304

RETRIEVING ONE OR MORE BENCHMARK PET AVATARS CORRESPONDING TO THE ONE OR MORE PET AVATARS
306

ANALYZING THE ONE OR MORE BENCHMARK PET AVATARS, THE ONE OR MORE PET AVATARS, THE ONE OR MORE PET AILMENTS, THE PET RECOVERY DATA, AND/OR THE ONE OR MORE LEVELS OF RECOVERY OF THE ONE OR MORE PETS TO DETERMINE ONE OR MORE PREDICTED LEVELS OF RECOVERY
308

RECEIVING, BY ONE OR MORE PROCESSORS, AT LEAST ONE PET AVATAR, AT LEAST ONE PET AILMENT, AND PET RECOVERY DATA OF AT LEAST ONE PET FROM A USER DEVICE, THE AT LEAST ONE PET AVATAR INCLUDING A THREE-DIMENSIONAL REPRESENTATION OF THE AT LEAST ONE PET
402

DETERMINING, BY THE ONE OR MORE PROCESSORS AND USING A TRAINED MACHINE-LEARNING MODEL, AT LEAST ONE LEVEL OF RECOVERY FOR THE AT LEAST ONE PET BASED ON THE AT LEAST ONE PET AVATAR, THE AT LEAST ONE PET AILMENT, AND THE PET RECOVERY DATA
404

BASED ON THE AT LEAST ONE LEVEL OF RECOVERY, DETERMINING, BY THE ONE OR MORE PROCESSORS, AT LEAST ONE PRODUCT OR SERVICE RECOMMENDATION
406

DISPLAYING, BY THE ONE OR MORE PROCESSORS, THE AT LEAST ONE LEVEL OF RECOVERY AND THE AT LEAST ONE PRODUCT OR SERVICE RECOMMENDATION ON ONE OR MORE USER INTERFACES OF THE USER DEVICE
408

*FIG. 4*

SYSTEMS AND METHODS FOR A THREE-DIMENSIONAL DIGITAL PET REPRESENTATION PLATFORM

CROSS-REFERENCE TO RELATED APPLICATION

This application claims the benefit of priority to U.S. Provisional Application No. 63/371,541, filed on Aug. 16, 2022, the entirety of which is incorporated herein by reference.

TECHNICAL FIELD

Various embodiments of this disclosure relate generally to systems and methods for creating a three-dimensional pet avatar. In some embodiments, the disclosure relates to systems and methods for training and using a machine-learning based model to utilize a three-dimensional pet avatar to evaluate a corresponding pet's medical recovery.

BACKGROUND

Pet owners long for the ability to encapsulate a pet's looks in a representation of the pet. Conventional techniques may include generating two-dimensional graphics of the pet. However, two-dimensional graphics of the pet fail to encapsulate true dimensions of the pet. Furthermore, conventional techniques lack the capability to provide a pet owner with a true three-dimensional representation of the pet that includes both the appearance and mannerisms of the pet. Therefore, there is a need to encapsulate the pet's looks as well as physical mannerisms in a three-dimensional representation, in order to allow for the pet owner, as well as third party services (e.g., veterinarians, veterinarian universities, insurance companies, groomers, pet clothing designers, and the like), to interact with the representation of the pet and infer additional information about the pet.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for creating a three-dimensional pet avatar.

In one aspect, an exemplary embodiment of a method for creating a three-dimensional pet avatar is disclosed. The method may include receiving, by one or more processors, pet image data and at least one physical characteristic corresponding to at least one pet from a user device, the at least one physical characteristic including at least one pet breed. The method may further include, in response to sending an additional characteristic request to at least one service, receiving, by the one or more processors, at least one additional pet characteristic corresponding to the at least one pet breed from the at least one service. The method may further include generating, by the one or more processors, at least one pet avatar based on the pet image data, the at least one physical characteristic, and the at least one additional pet characteristic, wherein the at least one pet avatar includes a three-dimensional pet representation of the at least one pet. The method may further include displaying, by the one or more processors, the at least one pet avatar on one or more user interfaces of the user device.

In a further aspect, an exemplary embodiment of a computer system for creating a three-dimensional pet avatar may include at least one memory storing instructions and at least one processor configured to execute the instructions to perform operations is disclosed. The operations may include receiving pet image data and at least one physical characteristic corresponding to at least one pet from a user device, the at least one physical characteristic including at least one pet breed. The operations may further include, in response to sending an additional characteristic request to at least one service, receiving at least one additional pet characteristic corresponding to the at least one pet breed from the at least one service. The operations may further include generating at least one pet avatar based on the pet image data, the at least one physical characteristic, and the at least one additional pet characteristic, wherein the at least one pet avatar includes a three-dimensional pet representation of the at least one pet. The operations may further include displaying the at least one pet avatar on one or more user interfaces of the user device.

In a further aspect, a non-transitory computer-readable medium may contain instructions that, when executed by a processor, cause the processor to perform operations for creating a three-dimensional pet avatar. The operations may include receiving pet image data and at least one physical characteristic corresponding to at least one pet from a user device, the at least one physical characteristic including at least one pet breed. The operations may further include, in response to sending an additional characteristic request to at least one service, receiving at least one additional pet characteristic corresponding to the at least one pet breed from the at least one service. The operations may further include generating at least one pet avatar based on the pet image data, the at least one physical characteristic, and the at least one additional pet characteristic, wherein the at least one pet avatar includes a three-dimensional pet representation of the at least one pet. The operations may further include displaying the at least one pet avatar on one or more user interfaces of the user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts an exemplary environment that may be utilized with techniques presented herein, according to one or more embodiments.

FIG. 2 depicts a flowchart of an exemplary method for creating a three-dimensional pet avatar, according to one or more embodiments.

FIG. 3 depicts a flowchart of an exemplary method of training a machine-learning model to use a three-dimensional pet avatar to evaluate the medical recovery of a corresponding pet, according to one or more embodiments.

FIG. 4 depicts a flowchart of an exemplary method of using a trained machine-learning model to utilize a three-dimensional pet avatar to evaluate the medical recovery of a corresponding pet, according to one or more embodiments.

DETAILED DESCRIPTION OF EMBODIMENTS

Figure 5:
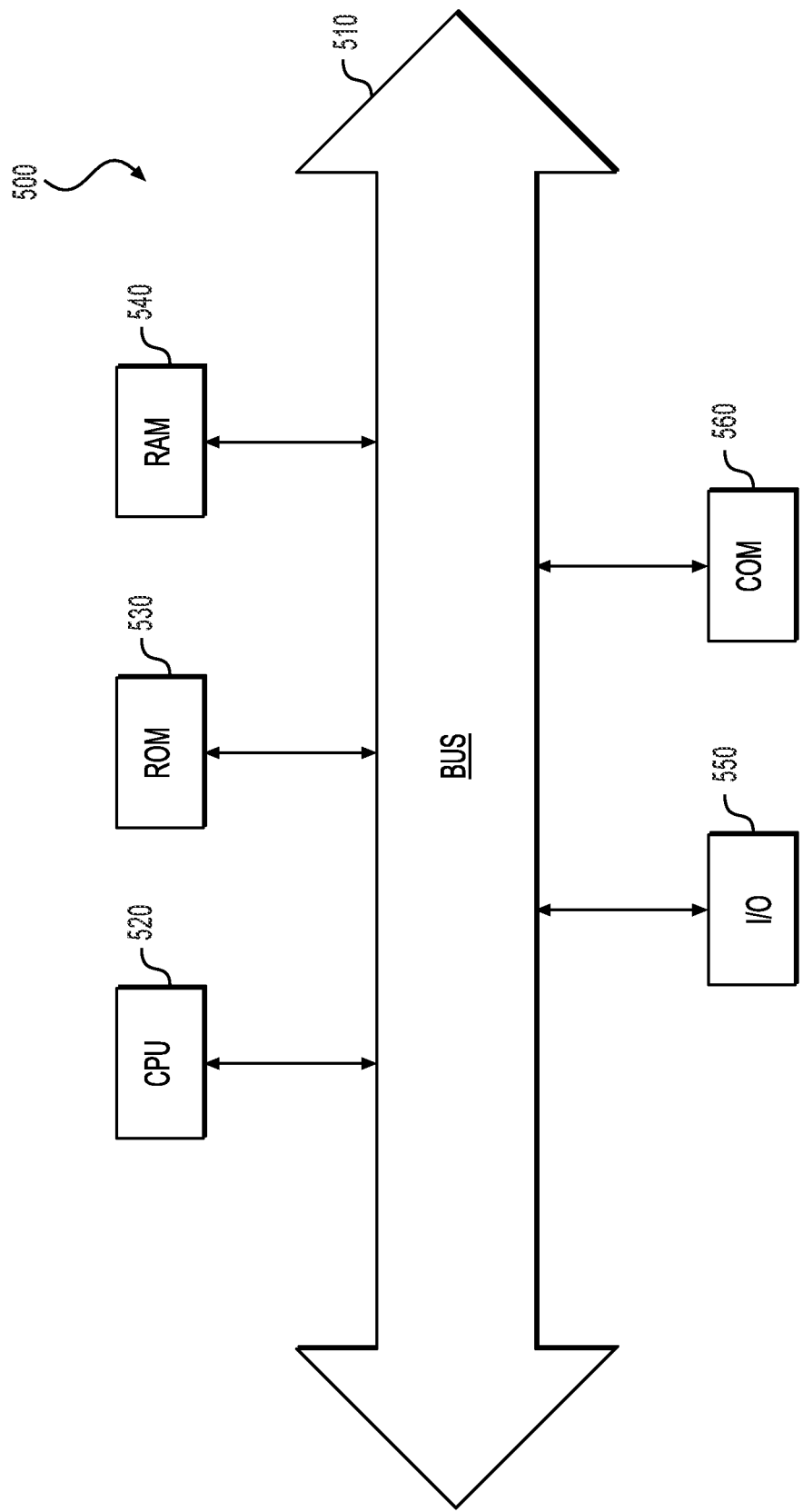
FIG. 5 depicts an example of a computing device that may execute the techniques described herein, according to one or more embodiments.

According to certain aspects of the disclosure, methods and systems are disclosed for creating a three-dimensional pet avatar. Conventional techniques may not be suitable because conventional techniques do not account for a pet's mannerisms and/or appearance details (e.g., dimensions). Additionally, conventional techniques may not dynamically adapt to real-time modifications of a pet's appearance and/or mannerisms. Accordingly, improvements in technology relating to creating three-dimensional pet avatars of pets are needed.

A digital representation of a pet is very important to a pet owner. For example, the digital representation may act as a permanent (or semi-permanent) record of the pet. Moreover, as the metaverse increases in popularity, pet owners have begun to desire the ability for their pet to have a presence in the metaverse. For example, a pet may have a presence in the metaverse that exists beyond the lifetime of the pet, where the pet may interact with other pets, as well as other users.

A need exists for a three-dimensional pet avatar that encapsulates the appearance and/or mannerisms of a pet, among other characteristics of the pet. Such three-dimensional pet avatar may be implemented in different environments, such as the metaverse. Additionally, the pet owner, as well as third parties, may modify the three-dimensional pet avatar to reflect changes in the pet's appearance and/or mannerisms. For example, the three-dimensional pet avatar may be utilized for diagnosing medical ailments, benchmarking recovery from an injury, providing product or service recommendations, showing relationships with other three-dimensional pet avatars based on pet genetic data, pet pedigree data, and/or pet adoption registration data, as well as manipulating the three-dimensional pet representation to reflect potential changes in the pet's appearance. For example, a pet owner may modify the three-dimensional pet avatar to reflect a medical ailment, such as a limp. A veterinarian, students at a veterinarian university, or a machine-learning model may then analyze the three-dimensional avatar to benchmark recovery from an injury and/or determine the best course of treatment. For example, a pet groomer may modify the appearance of the three-dimensional avatar to reflect how a potential haircut may look on the pet. Additionally, for example, a pet clothing designer may use the three-dimensional avatar to determine the dimensions of the pet to customize clothing. The pet clothing designer may also use the three-dimensional avatar to reflect how clothing may look on the pet. Further, insurance companies may use the three-dimensional pet avatar to determine types of policies and/or a rate for the policies that the pet may qualify for.

As will be discussed in more detail below, in various embodiments, systems and methods are described for creating a three-dimensional pet avatar. The systems and methods may receive pet image data and at least one physical characteristic corresponding to at least one pet from a user device, the at least one physical characteristic including at least one pet breed. The systems and methods may then, in response to sending an additional characteristic request to at least one service, receive at least one additional pet characteristic corresponding to the at least one pet breed from the at least one service. The systems and methods may then generate at least one pet avatar based on the pet image data, the at least one physical characteristic, and the at least one additional pet characteristic, wherein the at least one pet avatar includes a three-dimensional pet representation of the at least one pet. The systems and methods may then display the at least one pet avatar on one or more user interfaces of the user device.

As will be discussed in more detail below, in various embodiments, systems and methods are described for using a machine-learning model to utilize a three-dimensional pet avatar to evaluate the medical recovery of a corresponding pet. By training a machine-learning model, e.g., via supervised or semi-supervised learning, to learn associations between one or more pet avatars, one or more benchmark pet avatars, one or more pet ailments, pet recovery data of one or more pets, and/or one or more levels of recovery, the trained machine-learning model may be usable to predict one or more levels of recovery.

As will be discussed in more detail below, machine learning techniques adapted to predict one or more levels of recovery of a pet, may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

One or more implementations of the disclosed subject matter may be implemented in the metaverse. The metaverse, also known as the spatial internet, corresponds to virtual spaces where a user can create and explore with other people that the user is not in physical contact or proximity with. The metaverse may be spread out over a variety of collective virtual shared spaces, created by the convergence of virtually enhanced physical reality and physically persistent virtual space, including the sum of all virtual worlds, augmented reality, and internet products and services. Accordingly, any applicable aspect of the disclosed subject matter may be implemented in the metaverse.

The techniques disclosed in this application are not only limited to three-dimensional pet avatars. Such techniques may be applied to one-dimensional pet avatar embodiments, two-dimensional pet avatar embodiments, three-dimensional pet avatar embodiments, four-dimensional pet avatar embodiments, and the like.

Exemplary Environment

FIG. 1 depicts an exemplary environment 100 that may be utilized with techniques presented herein. One or more user device(s) 105, one or more external system(s) 110, and one or more server system(s) 115 may communicate across a network 101. As will be discussed in further detail below, one or more server system(s) 115 may communicate with one or more of the other components of the environment 100 across network 101. The one or more user device(s) 105 may be associated with a user, e.g., a user associated with one or more of generating a three-dimensional pet avatar, or training/tuning a machine-learning model for utilizing a three-dimensional pet avatar.

In some embodiments, the components of the environment 100 are associated with a common entity, e.g., a metaverse, veterinarian, clinic, animal specialist, research center, university, or the like. In some embodiments, one or more of the components of the environment is associated with a different entity than another. The systems and devices of the environment 100 may communicate in any arrangement. As will be discussed herein, systems and/or devices of the environment 100 may communicate in order to one or more of create a three-dimensional pet avatar and/or generate, train, and/or use a machine-learning model to generate and/or utilize a three-dimensional pet avatar, among other activities.

The user device 105 may be configured to enable the user to access and/or interact with other systems in the environment 100. For example, the user device 105 may be a computer system such as, for example, an augmented reality device, a virtual reality device, a device for interacting with the metaverse, a desktop computer, a mobile device, a tablet, etc. In some embodiments, the user device 105 may include one or more electronic application(s), e.g., a program, plugin, browser extension, etc., installed on a memory of the user device 105.

The user device 105 may include a display/user interface (UI) 105A, a processor 105B, a memory 105C, and/or a network interface 105D. The user device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit streaming data to network 101. The display/UI 105A may be a touch screen or a display with other input systems (e.g., mouse, keyboard, headset, etc.) so that the user(s) may interact with the application and/or the O/S. The network interface 105D may be a TCP/IP network interface for, e.g., Ethernet or wireless communications with the network 101. The processor 105B, while executing the application, may generate data and/or receive user inputs from the display/UI 105A and/or receive/transmit messages to the server system 115, and may further perform one or more operations prior to providing an output to the network 101.

External systems 110 may be, for example, one or more third party and/or auxiliary systems that integrate and/or communicate with the server system 115 in performing various three-dimensional pet avatar tasks. External systems 110 may be in communication with other device(s) or system(s) in the environment 100 over the one or more networks 101. For example, external systems 110 may communicate with the server system 115 via API (application programming interface) access over the one or more networks 101, and also communicate with the user device(s) 105 via web browser access over the one or more networks 101.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device.

The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 115 may include an electronic data system, e.g., a computer-readable memory such as a hard drive, flash drive, disk, etc. In some embodiments, the server system 115 includes and/or interacts with an application programming interface for exchanging data to other systems, e.g., one or more of the other components of the environment.

The server system 115 may include a database 115A and at least one server 115B. The server system 115 may be a computer, system of computers (e.g., rack server(s)), and/or or a cloud service computer system. The server system may store or have access to database 115A (e.g., hosted on a third party server or in memory 115E). The server(s) may include a display/UI 115C, a processor 115D, a memory 115E, and/or a network interface 115F. The display/UI 115C may be a touch screen or a display with other input systems (e.g., mouse, keyboard, headset, etc.) for an operator of the server 115B to control the functions of the server 115B. The server system 115 may execute, by the processor 115D, an operating system (O/S) and at least one instance of a servlet program (each stored in memory 115E).

The server system 115 may generate, store, and/or modify a three-dimensional pet avatar. The server system 115 may include a machine-learning model and/or instructions associated with the machine-learning model, e.g., instructions for generating a machine-learning model, training the machine-learning model, using the machine-learning model, etc. The server system 115 may include instructions for modifying the three-dimensional pet avatar, e.g., based on the output of the machine-learning model, and/or operating the display 115C to output three-dimensional pet avatar data, e.g., as adjusted based on the machine-learning model. The server system 115 may include training data, e.g., one or more pet avatars, one or more benchmark pet avatars, one or more pet ailments, pet recovery data of one or more pets, and/or one or more levels of recovery.

In some embodiments, a system or device other than the server system 115 is used to generate and/or train the machine-learning model. For example, such a system may include instructions for generating the machine-learning model, the training data and ground truth, and/or instructions for training the machine-learning model. A resulting trained machine-learning model may then be provided to the server system 115.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between the one or more pet avatars, one or more benchmark pet avatars, one or more pet ailments, pet recovery data of one or more pets, and/or one or more levels of recovery, such that the trained machine-learning model is configured to determine a pet's level of recovery based on the learned associations.

In various embodiments, the variables of a machine-learning model may be interrelated in any suitable arrangement in order to generate the output. For example, in some embodiments, the machine-learning model may include signal processing architecture that is configured to identify, isolate, and/or extract features, patterns, and/or structure in a text. For example, the machine-learning model may include one or more convolutional neural network ("CNN") configured to identify features in the document information data, and may include further architecture, e.g., a connected layer, neural network, etc., configured to determine a relationship between the identified features in order to evaluate the medical recovery of a pet.

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Further aspects of creating a three-dimensional pet avatar, as well as how the machine-learning model may utilize the three-dimensional pet avatar to evaluate the medical recovery of a pet are discussed in further detail in the methods below. In the following methods, various acts may be described as performed or executed by a component from FIG. 1, such as the server system 115, the user device 105, or components thereof. However, it should be understood that in various embodiments, various components of the environment 100 discussed below may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

In general, any process or operation discussed in this disclosure that is understood to be computer-implementable, such as the processes illustrated in FIGS. 2-4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Exemplary Process for Creating a Three-Dimensional Pet Avatar

FIG. 2 illustrates an exemplary process 200 for creating a three-dimensional pet avatar, according to one or more embodiments. Notably, method 200 may be performed by one or more processors of a server that is in communication with one or more user devices and other external system(s) via a network. However, it should be noted that method 200 may be performed by any one or more of the server, one or more user devices, or other external systems.

The method may include receiving, by one or more processors, pet image data and at least one physical characteristic corresponding to at least one pet from a user device, the at least one physical characteristic including at least one pet breed (Step 202). The at least one pet breed may include a single pet breed (e.g., a purebred pet) or multiple pet breeds (e.g., a mixed-breed pet). The pet image data may include at least one photo, at least one video clip, at least one x-ray, at least one sketch, and/or at least one image created via an application that corresponds to at least one pet. In some embodiments, the pet image data may include other pet data, such as pet clinical data, pet genetic data, pet pedigree data, pet adoption registration data, Internet of Things data, or diagnostic pet data. In some embodiments, the pet image data may be received from one or more user devices. Additionally, the pet image data may be created by a user of the user device. For example, a user may create a sketch of at least one pet using the user device. The user may then submit the sketch as pet image data. The at least one physical characteristic may include at least one breed of the at least one pet. The at least one physical characteristic may also include a diameter of an element of the at least one pet, a circumference of an element of the at least one pet, a height, a weight, at least one coat color, at least one eye color, a tail style, at least one ear length, a coat length, at least one eye size, an age, or a coat style. For example, the diameter of an element of the at least one pet may include the diameter of a pet's leg, torso, neck, tail, and the like. Additionally, for example, the circumference of an element of the at least one pet may include the circumference of the pet's leg, torso, neck, tail, and the like. Additionally, for example, the coat color may correspond to the color(s) of the pet. The tail style may include whether the tail is short, long, curly, straight, and the like. The at least one ear length may include to the length of one or more ears of the pet. The coat style may include whether the coat is straight, curly, thick, thin, and the like. In some embodiments, a prompt may be displayed on the user device, where the prompt requests the pet image data and/or at least one physical characteristic. For example, in response to the displayed prompt, the user may input the pet image data and/or at least one physical characteristic of the at least one pet into the user device.

The method may also include receiving, by the one or more processors, at least one mannerism of the at least one pet, the at least one mannerism including at least one pet sitting action, at least one pet physical action, or at least one pet physical habit. The at least one pet sitting action may include how the pet sits and/or how the pet stands. The at least one pet physical action may include how the pet walks, runs, jumps, plays, and the like. The at least one pet physical habit may include at least one unique mannerism and/or trick of the pet, such as a limp, a twitch, a trick the owner taught the pet, and the like. In some embodiments, the at least one mannerism may be received from the one or more user devices. Additionally, the at least one mannerism may be depicted by at least one photo, at least one video clip, at least one sketch, or at least one image created via an application that corresponds to at least one pet. For example, a user may select a video clip of the at least one pet running through a field. A prompt may be displayed on the user device for the user to input the at least one mannerism. For example, in response to displaying the prompt, the user may input the at least one mannerism of the at least one pet.

The method may further include, in response to sending an additional characteristic request to at least one service, receiving, by the one or more processors, at least one additional pet characteristic corresponding to the at least one pet breed from the at least one service (Step 204). The additional characteristic request may include the received at least one pet breed, but may also include additional information, such as the pet image data, at least one physical characteristic, and/or at least one mannerism. The additional characteristic request may be sent to at least one service. For example, the at least one service may include an internal or external service that includes at least one database.

In some embodiments, the method may also include receiving, by the one or more processors, the additional characteristic request, wherein the additional characteristic request includes the at least one pet breed. The method may further include searching, by the one or more processors, at least one database of the at least one service for at least one database record that matches the at least one pet breed, wherein the at least one database record includes at least one default three-dimensional visual pet representation, at least one stored pet breed, at least one additional physical characteristic, at least one growth indication, or at least one body condition. The at least one database of the at least one service may store at least one database record. The at least one database record may include default information corresponding to a pet breed. For example, the default information may include at least one default three-dimensional pet representation, at least one pet breed, at least one additional pet characteristic, at least one growth indication, and/or at least one body condition. The default three-dimensional pet representation may correspond to a standard three-dimensional pet representation of the at least one pet breed, where the at least one pet breed may include a single breed or a mixed-breed (e.g., multiple pet breeds). The at least one additional pet characteristic may correspond to pet characteristic data of the pet breed, such as a diameter of an element of the at least one pet breed, a circumference of an element of the at least one pet breed, a height, a weight, at least one coat color, at least one eye color, a tail style, at least one ear length, a coat length, at least one eye size, an age, or a coat style of the at least one pet breed. The at least one growth indication may correspond to a growth rate of the at least one breed. For example, the growth rate may be associated with a particular age of the at least one breed. The at least one body condition may correspond to the overall body type of the at least one breed. For example, the at least one body condition may include stout, lanky, and the like. Additionally, the database may include at least one growth chart or at least one body condition for the at least one pet breed. The at least one growth chart may provide data regarding the growth rate of the at least one breed.

The method may further include generating, by the one or more processors, at least one pet avatar based on the pet image data, the at least one physical characteristic, and the at least one additional pet characteristic, wherein the at least one pet avatar includes a three-dimensional pet representation of the at least one pet (Step 206). In some embodiments, the method may include modifying the default three-dimensional pet representation based on the pet image data, the at least one physical characteristic, and/or the at least one additional pet characteristic. The at least one pet avatar may include a three-dimensional pet representation of the at least one pet.

The method may further include displaying, by the one or more processors, the at least one pet avatar on one or more user interfaces of the user device (Step 208). For example, the at least one pet avatar may be displayed on one or more user interfaces of the user device. In some embodiments, the at least one pet avatar may be displayed as part of a photo gallery, showcase, and/or profile(s) on one or more platforms or publishers. In some embodiments, the at least one pet avatar may be displayed in one or more virtual worlds, such as the metaverse. Additionally, the user may interact with the at least one pet avatar in the metaverse using virtual reality and/or augmented reality technology (e.g., headsets). In some examples, additional data associated with the pet (e.g., data received at step 202 and/or step 204) may be displayed in association with the pet avatar in the metaverse. As one illustrative example, when the pet avatar is within a predefined proximity of another one or more pet avatars having the same or similar pet genetic data and/or pet pedigree data, a visual relationship indicator may be shown to indicate a relationship between the pets represented by the pet avatars (e.g., an indication that these pets are siblings, parent-child, etc.). A similar indicator may be displayed to show a relationship between pets that were adopted from a same shelter, for example, based on pet adoption registration data. Additionally or alternatively, the additional pet data may be visually displayed in association with the pet avatar regardless of proximity to other pet avatars having similar characteristics.

The method may include, in response to the displaying, receiving, by the one or more processors, at least one modification from the user device. For example, the user may indicate that one or more physical characteristics (e.g., coat color, leg length, tail length, and the like) of the at least one pet avatar should be modified. In some embodiments, the user may communicate the at least one modification using virtual reality and/or augmented reality technology. In some embodiments, the at least one modification may include a modification to the at least one mannerism. For example, the user may indicate that the pet walks with a limp.

The method may also include updating, by the one or more processors, the at least one pet avatar based on the at least one modification. Upon receiving the at least one modification, the one or more processors may update the at least one pet avatar. In some embodiments, upon updating the at least one pet avatar, the one or more processors may display the updated at least one pet avatar.

The method may include storing, by the one or more processors, the at least one pet avatar. For example, the at least one pet avatar may be stored in one or more data stores (e.g., one or more databases) for future use (e.g., modifications/updates). In some embodiments, the at least one pet avatar may be stored in one or more data stores with corresponding pet avatar information. The pet avatar information may include the pet image data, the at least one physical characteristic, and/or at least one user identifier associated with the user.

The method may include receiving, by the one or more processors, at least one medical ailment description. The at least one medical ailment description may include a limp, a twitch, a physical defect, a wound, and the like. In some embodiments, the user may input the at least one medical ailment description via the user device, such as using words, photos, videos, x-rays, and the like. Additionally, or alternatively, one or more medical ailment options may be displayed on the user device for the user's selection. The method may also include modifying, by the one or more processors, the at least one pet avatar to reflect the at least one medical ailment description. For example, if the at least one medical ailment description indicates a limp in a front right paw, the at least one pet avatar may be modified to reflect a limp in the front right paw.

In some embodiments, the method may include analyzing, by the one or more processors, the at least one pet avatar to determine a medical condition. For example, the analyzing of the at least one pet avatar may result in determining that the at least one pet avatar indicates a limp in the front left paw. In some embodiments, the analyzing may include comparing the at least one pet avatar with a previously stored pet avatar. The method may also include displaying, by the one or more processors, an alert on the user device indicating the medical condition. For example, the alert may indicate that the pet may have a limp in the front left paw and may require medical attention.

Although FIG. 2 shows example blocks of exemplary method 200, in some implementations, the exemplary method 200 may include additional blocks, fewer blocks, different blocks, or differently arranged blocks than those depicted in FIG. 2. Additionally, or alternatively, two or more of the blocks of the exemplary method 200 may be performed in parallel.

Training a Machine-Learning Model to Evaluate the Medical Recovery of a Pet

FIG. 3 further illustrates a method 300 for training the machine-learning model to use a three-dimensional pet avatar to evaluate the medical recovery of a corresponding pet, according to one or more embodiments. Notably, method 300 may be performed by one or more processors of a server that is in communication with one or more user devices and other external system(s) via a network. However, it should be noted that method 300 may be performed by any one or more of the server, one or more user devices, or other external systems.

The method may include receiving, by one or more processors, one or more pet avatars, pet data, one or more pet ailments, pet recovery data of one or more pets, and/or one or more levels of recovery, the one or more pet avatars including a three-dimensional representation of each of the one or more pets (Step 302). The data received at step 302 may be used in training a machine learning model. The one or more pet avatars may have been created by the process described in FIG. 2. Additionally, or alternatively, the one or more pet avatars may have been previously stored in one or more data stores. The one or more pet avatars may include one or more three-dimensional representations of each of the one or more pets. The one or more pet ailments may include one or more visual ailments or one or more descriptor ailments. The one or more visual ailments may be described by video, photos, x-rays, sketches, and the like. In some embodiments, the one or more visual ailments may correspond to ailments that are external on a pet, such as a limp, wound, and the like. The one or more descriptor ailments may be described in a narrative form, using key words, and the like. In some embodiments, the one or more descriptor ailments may correspond to ailments that are internal on a pet, such as kidney failure, heart problems, and the like.

The pet recovery data may include one or more of: pet eating data, pet drinking data, pet movement data, pet bowel data, or pet sleeping data. The pet recovery data may correspond to a pet's behavior when the pet is recovering from an ailment (e.g., a surgery). For example, the pet eating data may include how frequently the pet eats food and/or how much food the pet eats. The pet drinking data may include how frequently the pet drinks water and/or how much water the pet drinks. The pet movement data may include how frequently the pet moves, the type of movement (e.g., walking, running, and the like), and/or how the pet moves (e.g., with a limp, with no limp, and the like). The pet bowel data may correspond to a pet's bowel movements, such as the type of bowel movement(s), the frequency of the bowel movements, and the like. The pet sleeping data may include how long the pet sleeps, where the pet sleeps, and the like. The pet recovery data may include data corresponding to the pet, such as at least one breed, age, weight, and the like.

The one or more levels of recovery may include one or more of: a progressing recovery level, a plateauing recovery level, or a declining recovery level. The progressing recovery level may indicate that the pet's recovery is progressing. The plateauing recovery level may indicate that the pet's recovery is plateauing (e.g., not progressing but not declining). The declining recovery level may indicate that the pet's recovery is declining. The one or more levels of recovery received in step 302 may be considered one or more "labels" in the model training data.

In some embodiments, the three-dimensional pet representation may include at least one pet characteristic and at least one pet mannerism. The at least one pet mannerism may include at least one of: at least one pet sitting action, at least one pet physical action, or at least one pet physical habit. The at least one pet sitting action may include how the pet sits and/or how the pet stands. The at least one pet physical action may include how the pet walks, runs, jumps, and the like. The at least one pet physical habit may include at least one unique mannerism of the pet, such as a limp, a twitch, and the like.

The method may include, upon the receiving, training, by the one or more processors, a machine-learning model to predict the one or more levels of recovery of the one or more pet avatars (Step 304). Such training is further described in detail below with respect to Steps 306 and 308.

The method may include retrieving one or more benchmark pet avatars corresponding to the one or more pet avatars (Step 306). The one or more benchmark pet avatars may include at least one previously stored pet avatar. The at least one previously stored pet avatar may illustrate how a pet with a particular ailment and/or recovery data would act. That way, the previously stored pet avatars may act as a benchmark for comparison to the one or more pet avatars. The retrieving may include determining that the one or more benchmark pet avatars include similar ailments and/or pet recovery data as each of the one or more pet avatars.

The method may include analyzing the one or more benchmark pet avatars, the one or more pet avatars, the one or more pet ailments, the pet recovery data, and/or the one or more levels of recovery of the one or more pets to determine one or more predicted levels of recovery (Step 308). In some embodiments, each of the one or more pet avatars may be compared to a corresponding benchmark pet avatar to determine whether the movement of the pet avatar is better than, worse than, or the same as the corresponding benchmark pet avatar. For example, the one or more predicted levels of recovery may include one or more of: a predicted progressing recovery level, a predicted plateauing recovery level, or a predicted declining recovery level. The predicted progressing recovery level may indicate that the pet's recovery is progressing. The predicted plateauing recovery level may indicate that the pet's recovery is plateauing (e.g., not progressing but not declining). The predicted declining recovery level may indicate that the pet's recovery is declining.

Although FIG. 3 shows example blocks of exemplary method 300, in some implementations, the exemplary method 300 may include additional blocks, fewer blocks, different blocks, or differently arranged blocks than those depicted in FIG. 3. Additionally, or alternatively, two or more of the blocks of the exemplary method 300 may be performed in parallel.

Using the Trained Machine-Learning Model to Evaluate a Pet's Medical Recovery

FIG. 4 illustrates an exemplary process for using a machine-learning model to utilize a three-dimensional pet avatar to evaluate the medical recovery of a corresponding pet, according to one or more embodiments. Notably, method 400 may be performed by one or more processors of a server that is in communication with one or more user devices and other external system(s) via a network. However, it should be noted that method 400 may be performed by any one or more of the server, one or more user devices, or other external systems.

The method may include receiving, by one or more processors, at least one pet avatar, at least one pet ailment, and pet recovery data of at least one pet from a user device, the at least one pet avatar including at least one three-dimensional representation of the at least one pet (Step 402). The at least one pet avatar may have been created by the process described in FIG. 2. Additionally, or alternatively, the at least one pet avatar may have been previously stored in one or more data stores. The at least one pet avatar may include at least one three-dimensional representation of at least one pet.

The at least one ailment may include at least one visual ailment or at least one descriptor ailment. The at least one visual ailment may be described by video, photos, x-rays, sketches, and the like. In some embodiments, the at least one visual ailment may indicate ailments that are external to a pet, such as a limp, wound, and the like. The at least one descriptor ailment may be described in a narrative form, using key words, and the like. In some embodiments, the at least one descriptor ailment may indicate ailments that are internal to the pet, such as kidney failure, heart problems, and the like.

The pet recovery data may include at least one of: pet eating data, pet drinking data, pet movement data, pet bowel data, or pet sleeping data. The pet recovery data may correspond to a pet's behavior when the pet is recovering from an ailment (e.g., a surgery). For example, the pet eating data may include how frequently the pet eats food and/or how much food the pet eats. The pet drinking data may include how frequently the pet drinks water and/or how much water the pet drinks. The pet movement data may include how frequently the pet moves, the type of movement (e.g., walking, running, and the like), and/or how the pet moves (e.g., with a limp, with no limp, and the like). The pet bowel data may correspond to a pet's bowel movements, such as the type of bowel movement(s), the frequency of the bowel movements, and the like. The pet sleeping data may include how long the pet sleeps, where the pet sleeps, and the like. In some embodiments, the pet recovery data may include at least one breed of the at least one pet.

In some embodiments, the three-dimensional pet representation may include at least one pet characteristic and at least one pet mannerism. The at least one pet mannerism may include at least one of: at least one pet sitting action, at least one pet physical action, or at least one pet physical habit. The at least one pet sitting action may include how the pet sits and/or how the pet stands. The at least one pet physical action may include how the pet walks, runs, jumps, and the like. The at least one pet physical habit may include at least one unique mannerism of the pet, such as a limp, a twitch, and the like.

The method may include determining, by the one or more processors and using a trained machine-learning model, at least one level of recovery for the at least one pet based on the at least one pet avatar, the at least one pet ailment, and the pet recovery data (Step 404). For example, the trained machine-learning model may have been trained according to the process described in FIG. 3.

The method may include, based on the at least one level of recovery, determining, by the one or more processors, at least one product or service recommendation (Step 406). In some embodiments, a request for a recommendation may be sent to a content service, where the request may include request information. For example, the request information may include the at least one level of recovery, the at least one pet ailment, and/or pet recovery data. In response to receiving the request, the content service may search one or more data stores for at least one product or service recommendation based on the request information. The method may also include receiving the at least one product or service recommendation from the content service. The at least one product or service recommendation may include at least one of a pet food, a pet tool, a pet toy, a therapy recommendation, a veterinarian recommendation, and the like.

The method may include displaying, by the one or more processors, the at least one level of recovery and the at least one product or service recommendation on one or more user interfaces of the user device (Step 408). For example, the at least one level of recovery and the at least one product or service recommendation may be displayed on one or more user interfaces of the user device. In some embodiments, the at least one level of recovery and/or the at least one product or service recommendation may be displayed in one or more virtual worlds, such as the metaverse. Additionally, the user may interact with the at least one level of recovery and/or the at least one product or service recommendation in the metaverse using virtual reality and/or augmented reality technology (e.g., headsets).

The method may include providing, by the one or more processors, a plurality of visual outputs to one or more interfaces of the user device, each of the plurality of visual outputs including a three-dimensional representation of a similar pet with varying degrees of the at least one ailment. For example, if the at least one ailment indicates that the pet has a limp in the back right leg, the plurality of visual outputs may include one or more three-dimensional representations of a similar pet with a limp in the back right leg. Additionally, each limp in such three-dimensional representations may have a different degree of severity.

The method may further include, in response to providing the plurality of visual outputs, receiving, by the one or more processors, at least one user selection of at least one of the plurality of visual outputs. For example, the user may select one of the plurality of visual outputs that is most similar to the user's pet's ailment.

The method may further include, based on the at least one user selection, determining, by the one or more processors and using the trained machine-learning model, the at least one level of recovery. In some embodiments, a trained-machine-learning model may determine the at least one level of recovery based on the at least one user selection of at least one of the plurality of visual outputs.

Although FIG. 4 shows example blocks of exemplary method 400, in some implementations, the exemplary method 400 may include additional blocks, fewer blocks, different blocks, or differently arranged blocks than those depicted in FIG. 4. Additionally, or alternatively, two or more of the blocks of the exemplary method 400 may be performed in parallel.

Exemplary Device

FIG. 5 is a simplified functional block diagram of a computer 500 that may be configured as a device for executing the methods of FIGS. 2-4, according to exemplary embodiments of the present disclosure. For example, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the general description and the detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

As used herein, a term such as "user" or the like generally encompasses a pet parent and/or pet parents. A term such as "pet" or the like generally encompasses a user's pet, where the term may encompass multiple pets. Example pets may include, dogs, cats, birds, horses, turtles, and the like.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model/system is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), decision tree, gradient boosting in a decision tree, deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for evaluating a recovery from a pet ailment based on a three-dimensional pet avatar, the method comprising:
   receiving, by one or more processors, pet image data and at least one physical characteristic corresponding to at least one pet from a user device, the at least one physical characteristic including at least one pet breed;
   in response to sending an additional characteristic request to at least one service, receiving, by the one or more processors, at least one additional pet characteristic corresponding to the at least one pet breed from the at least one service;
   generating, by the one or more processors, at least one pet avatar based on the pet image data, the at least one physical characteristic, and the at least one additional pet characteristic, wherein the at least one pet avatar includes a three-dimensional pet representation of the at least one pet;
   receiving, by the one or more processors, at least one pet ailment and pet recovery data of the at least one pet, the pet recovery data corresponding to a behavior of the at least one pet while recovering from the at least one pet ailment;
   determining, by the one or more processors and using a trained machine learning model, at least one level of recovery for the at least one pet based on the at least one pet avatar, the at least one pet ailment, and the pet recovery data; and causing a display, by the one or more processors, of the at least one pet avatar and the at least one level of recovery on one or more user interfaces of the user device.

2. The computer-implemented method of claim 1, the method further comprising:

receiving, by the one or more processors and from the user device, at least one modification associated with the at least one pet avatar displayed on the one or more user interfaces; and updating, by the one or more processors, the at least one pet avatar based on the at least one modification.

3. The computer-implemented method of claim 1, the at least one physical characteristic including a diameter of an element of the at least one pet, a circumference of an element of the at least one pet, a height, a weight, at least one coat color, at least one eye color, a tail style, at least one ear length, a coat length, at least one eye size, an age, or a coat style.

4. The computer-implemented method of claim 1, wherein the pet image data includes at least one of at least one photo, at least one x-ray, at least one video clip, at least one sketch, or at least one image created via an application.

5. The computer-implemented method of claim 1, wherein receiving the at least one additional pet characteristic includes:

receiving, by the one or more processors, the additional characteristic request, wherein the additional characteristic request includes the at least one pet breed; and searching, by the one or more processors, at least one database of the at least one service for at least one database record that matches the at least one pet breed, wherein the at least one database record includes at least one default three-dimensional visual pet representation, at least one stored pet breed, at least one additional physical characteristic, at least one growth indication, or at least one body condition.

6. The computer-implemented method of claim 5, the at least one database including at least one growth chart for the at least one pet breed.

7. The computer-implemented method of claim 1, the method further comprising:

receiving, by the one or more processors, as part of data associated with the at least one pet ailment, at least one medical ailment description; and modifying, by the one or more processors, the at least one pet avatar to reflect the at least one medical ailment description.

8. The computer-implemented method of claim 1, the method further comprising:

receiving, by the one or more processors, at least one mannerism of the at least one pet, the at least one mannerism including at least one pet sitting action, at least one pet physical action, or at least one pet physical habit.

9. The computer-implemented method of claim 1, wherein the pet recovery data includes one or more of pet eating data, pet drinking data, pet movement data, pet bowel data, or pet sleeping data.

10. The computer-implemented method of claim 1, wherein the at least one level of recovery includes a progressing recovery level, a plateauing recovery level, or a declining recovery level.

11. A computer system for evaluating a recovery from a pet ailment based on a three-dimensional pet avatar, the computer system comprising:

at least one memory storing instructions; and at least one processor configured to execute the instructions to perform operations comprising:

receiving pet image data and at least one physical characteristic corresponding to at least one pet from a user device, the at least one physical characteristic including at least one pet breed;

in response to sending an additional characteristic request to at least one service, receiving at least one additional pet characteristic corresponding to the at least one pet breed from the at least one service;

generating at least one pet avatar based on the pet image data, the at least one physical characteristic, and the at least one additional pet characteristic, wherein the at least one pet avatar includes a three-dimensional pet representation of the at least one pet;

receiving at least one pet ailment and pet recovery data of the at least one pet, the pet recovery data corresponding to a behavior of the at least one pet while recovering from the at least one pet ailment;

determining, using a trained machine learning model, at least one level of recovery for the at least one pet based on the at least one pet avatar, the at least one pet ailment, and the pet recovery data; and causing a display of the at least one pet avatar and the at least one level of recovery on one or more user interfaces of the user device.

12. The computer system of claim 11, the operations further comprising:

receiving, from the user device, at least one modification associated with the at least one pet avatar displayed on the one or more user interfaces; and updating the at least one pet avatar based on the at least one modification.

13. The computer system of claim 11, the at least one physical characteristic including a diameter of an element of the at least one pet, a circumference of an element of the at least one pet, a height, a weight, at least one coat color, at least one eye color, a tail style, at least one ear length, a coat length, at least one eye size, an age, or a coat style.

14. The computer system of claim 11, wherein the pet image data includes at least one of at least one photo, at least one video clip, at least one x-ray, at least one sketch, or at least one image created via an application.

15. The computer system of claim 11, wherein receiving the at least one additional pet characteristic includes:

receiving the additional characteristic request, wherein the additional characteristic request includes the at least one pet breed; and searching at least one database of the at least one service for at least one database record that matches the at least one pet breed, wherein the at least one database record includes at least one default three-dimensional visual pet representation, at least one stored pet breed, at least one additional physical characteristic, at least one growth indication, or at least one body condition.

16. The computer system of claim 11, the operations further comprising:

receiving, as part of data associated with the at least one pet ailment, at least one medical ailment description; and modifying the at least one pet avatar to reflect the at least one medical ailment description.

17. The computer system of claim 11, the operations further comprising:

receiving at least one mannerism of the at least one pet, the at least one mannerism including at least one pet sitting action, at least one pet physical action, or at least one pet physical habit.

18. A non-transitory computer-readable medium containing instructions that, when executed by a processor, cause the processor to perform operations for evaluating a recovery from a pet ailment based on a three-dimensional pet avatar, the operations comprising:

receiving pet image data and at least one physical characteristic corresponding to at least one pet from a user device, the at least one physical characteristic including at least one pet breed;

in response to sending an additional characteristic request to at least one service, receiving at least one additional pet characteristic corresponding to the at least one pet breed from the at least one service;

generating at least one pet avatar based on the pet image data, the at least one physical characteristic, and the at least one additional pet characteristic, wherein the at least one pet avatar includes a three-dimensional pet representation of the at least one pet;

receiving at least one pet ailment and pet recovery data of the at least one pet, the pet recovery data corresponding to a behavior of the at least one pet while recovering from the at least one pet ailment;

determining, using a trained machine learning model, at least one level of recovery for the at least one pet based on the at least one pet avatar, the at least one pet ailment, and the pet recovery data; and causing a display of the at least one pet avatar and the at least one level of recovery on one or more user interfaces of the user device.

19. The non-transitory computer-readable medium of claim 18, the at least one physical characteristic including a diameter of an element of the at least one pet, a circumference of an element of the at least one pet, a height, a weight, at least one coat color, at least one eye color, a tail style, at least one ear length, a coat length, at least one eye size, an age, or a coat style.

20. The non-transitory computer-readable medium of claim 18, wherein receiving the at least one additional pet characteristic includes:

receiving the additional characteristic request, wherein the additional characteristic request includes the at least one pet breed; and searching at least one database of the at least one service for at least one database record that matches the at least one pet breed, wherein the at least one database record includes at least one default three-dimensional visual pet representation, at least one stored pet breed, at least one additional physical characteristic, at least one growth indication, or at least one body condition.

* * * * *